United States Patent Office 3,456,622
Patented July 22, 1969

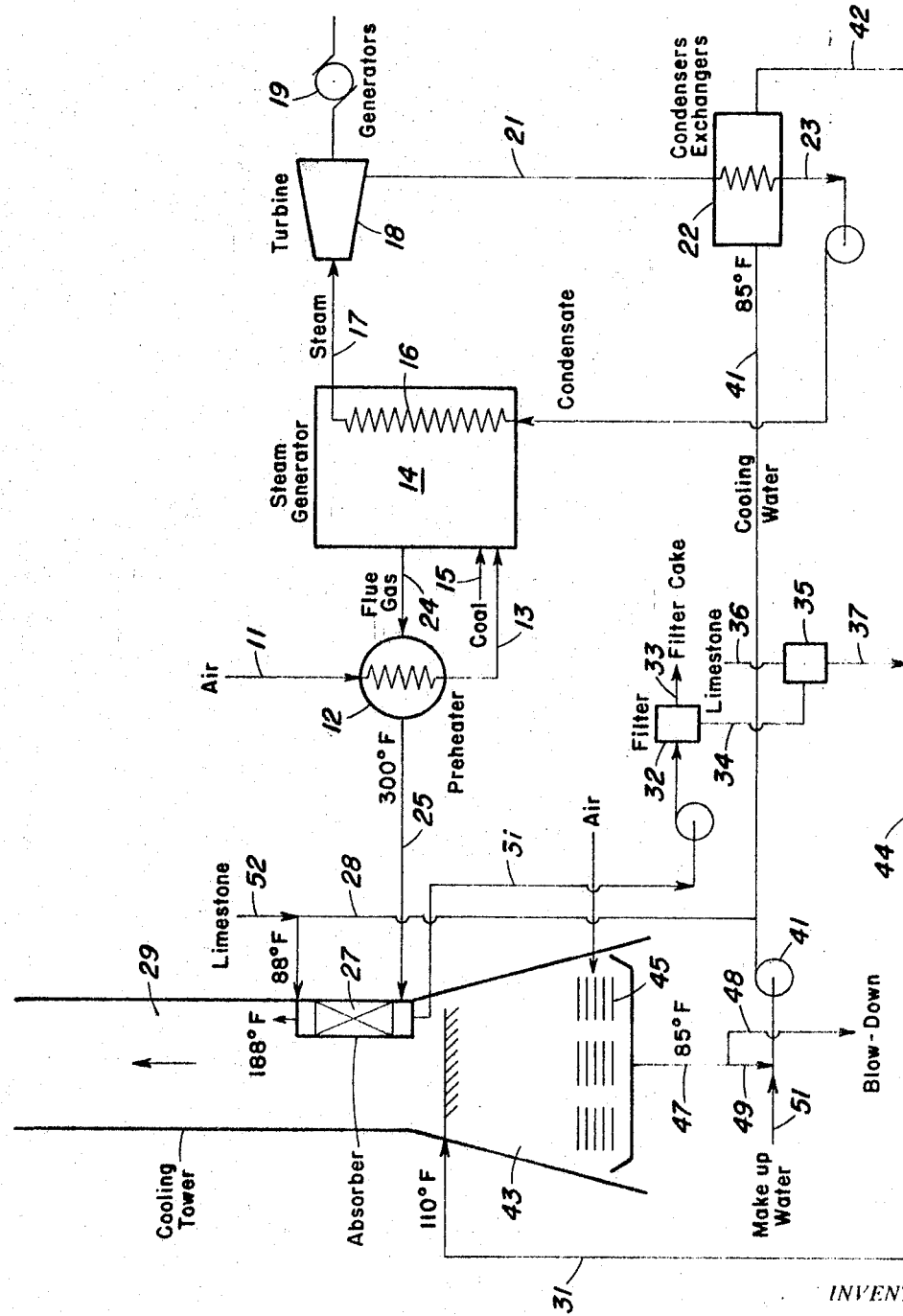

3,456,622
STACK GAS CLEANING PROCESS
James F. Thornton, New York, and Morgan C. Sze, Garden City, N.Y., assignors to The Lummus Company, New York, N.Y., a corporation of Delaware
Filed July 24, 1967, Ser. No. 655,476
Int. Cl. F22b 37/48; F28g 1/00; C10k 1/00
U.S. Cl. 122—379                    11 Claims

ABSTRACT OF THE DISCLOSURE

A process for removing sulfur dioxide from a plant off-gas and for cooling coolant water from the plant wherein the off-gas is scrubbed by direct contact with water, preferably containing calcium carbonate, in an intermediate portion of a combined cooling tower-stack, and the coolant water is cooled by direct contact with unsaturated atmospheric air in a lower portion of the combined cooling tower-stack. The air, now saturated with water vapor, is combined with the scrubbed off-gas, in the stack, and the diluted off-gas released to the atmosphere.

---

This invention is directed to a process for cleaning stack gases, and more particularly to removing sulfur compounds and fly ash from a plant off-gas.

Before releasing a plant off-gas, for example, from a boiler, into the atmosphere, it is necessary to remove undesirable matter therefrom, such as sulfur compounds and fly ash. While various devices have been provided for effecting such removal, because of increased industrial activity and increased interest in prevention of air pollution, there is a compelling need for new means to substantially remove these undesirable substances prior to discharging stack gases to the atmosphere.

Accordingly, an object of this invention is to provide an effective means for removing undesirable matter from a plant off-gas.

Another object of this invention is to provide a means for removing sulfur compounds and fly ash from a plant off-gas.

A further object of this invention is to effectively incorporate into existing equipment a means for removing undesirable matter from a plant off-gas.

Yet another object of this invention, is to provide a process for concurrently removing sulfur compounds from a plant off-gas and providing cooling requirements for the plant coolant.

These and other objects will become more readily apparent from the following detailed description of the invention when taken with reference to the accompanying drawing wherein:

The drawing is a schematic flow diagram of an embodiment of the process of the invention.

The objects of this invention are broadly accomplished by contacting a flue gas, containing sulfur dioxide, with water, in a stack prior to release thereof to the atmosphere. In accordance with a preferred embodiment of the invention, there is provided a combined cooling tower-stack wherein in one portion thereof, a plant off-gas, containing sulfur dioxide, is contacted with water to remove sulfur dioxide, and coolant water, at an elevated temperature, withdrawn from the plant is contacted, in another portion of the cooling tower-stack, with air to effect cooling of the water by evaporative cooling. The cooled water is recycled as coolant for the plant and the humidified air is combined with the scrubbed off-gas to effect dilution thereof, prior to release to the atmosphere.

The invention will be described in more detail with reference to the accompanying drawing. It is to be understood that equipments such as pumps, valves and the like have been omitted from the drawing to facilitate the description thereof and the placing of such equipments at appropriate places is deemed to be within the scope of those skilled in the art.

Referring now to the drawing, air in line 11 is passed through a preheater 12 herein the air is heated by indirect heat transfer with a flue gas, as hereinafter more fully described. The air from preheater 12 in line 13 is introduced into a steam generator; e.g. a boiler, generally indicated as 14, and mixed therein with a fuel, such as coal, introduced through line 15. The air-fuel mixture is ignited and the heat generated thereby vaporizes water flowing through boiler tubes, schematically indicated as 16. Steam is withdrawn from the tubes 16 through line 17, expanded in a turbine 18 which drives generators generally indicated as 19. Low pressure steam is withdrawn from the turbine 18 through line 21 and passed through a condensing zone, schematically indicated as 22 wherein the steam is condensed by indirect heat transfer with coolant water flowing therethrough, as hereinafter more fully described. Condensate is withdrawn from the condensing zone 22 through line 23 and recycled to the boiler tubes 16.

Combustion products, containing sulfur dioxide, fly ash and some sulfur trioxide are withdrawn from boiler 14 through line 24, and passed through preheater 12 to effect heating of the air flowing therethrough. A partially cooled flue gas from preheater 12 in line 25 is introduced into a scrubbing portion 27, containing suitable packing, of a hyperbolic cooling tower-stack generally indicated as 26. The flue gas is countercurrently contacted in the scrubbing portion 27 with water introduced therein through line 28 and as a result of such contact, the flue gas is scrubbed essentially free of sulfur dioxide, sulfur trioxide and fly ash. The sulfur dioxide and sulfur trioxide are dissolved in the water as sulfurous and sulfuric acid, respectively. The water introduced through line 28, preferably contains limestone (calcium carbonate) which reacts with the sulfur dioxide and sulfur trioxide, in the liquid phase, to produce calcium sulfite and calcium sulfate, respectively. The flue gas now essentially free of fly ash, sulfur dioxide and sulfur trioxide is passed from the scrubbing portion 27 to the stack portion 29 of the cooling tower-stack 26, diluted with air and released to the atmosphere, as hereinafter described.

The water, now containing fly ash, sulfuric acid, sulfurous acid and if calcium carbonate was initially added, solid calcium sulfite and calcium sulfate, is withdrawn from the scrubbing portion 27 of the cooling tower-stack 26 through line 31 and introduced into a filter 32 to separate solids therefrom. Solids are withdrawn from filter 32 through line 33. The solids free water, containing some sulfurous and sulfuric acid, is withdrawn from filter 32 through line 34 and introduced into a tank 35 wherein the acids are neutralized by the addition of a suitable base, such as calcium carbonate, through line 36. The neutralized water is withdrawn from tank 35 through line 37 for introduction into the cooling tower-stack 26, as hereinafter described.

Cooling water in line 41 is passed through the condensing zone 22 to effect condensation of the low pressure steam flowing therethrough. Water, now at an elevated temperature, withdrawn from condensing zone 22 through line 42, is combined with the water in line 35 and introduced into the cooling tower portion 43, containing suitable packing, of cooling tower-stack 26 through line 44. A natural draft of atmospheric air (the air is not saturated with respect to water vapor) is introduced into the cooling tower portion 43 through suitable air inlets 45 and countercurrently contacts the descending water introduced through line 44. As a result of such contact, the air is humidified resulting in concurrent cooling of the water. The humidified air flows upwardly into the stack portion 29 and is mixed therein with the flue gas from the scrubbing portion 27. The flue gas, now diluted with air is released from the top of the stack 29 into the atmosphere.

The cooled water is withdrawn from the cooling portion 43 of cooling tower-stack 26 through line 47 and a portion thereof purged through line 48 to prevent a build-up of scale forming materials in the circulating water system. The remaining portion of the water in line 49 is combined with make-up water introduced through line 51 and a portion of the combined portion passed through line 41 to the condensing zone 22. The remaining portion of the combined portion is passed through line 28 to the scrubbing portion 27 of the cooling tower-stack 26. Limestone may be added to the water in line 28 through line 52.

The process of the invention is extremely effective for removing sulfur compounds and fly ash from a gaseous stream. Although the process has been particularly described with reference to removing such matter from an off-gas from a boiler in a plant generating electricity, it is to be understood that the process of the invention is not limited to such an application and may be applied with equally good results to cleaning any plant off-gas containing fly ash and/or sulfur compounds. Similarly, although the cooling effected in cooling tower-stack 26 has been described with respect to cooling coolant water employed for condensing steam, it is to be understood that the process of the invention is also applicable for effecting cooling of coolant water employed for other purposes.

The invention is further illustrated by the following example but its scope is not to be limited thereby:

Example

A flue gas having the composition shown in Table I is scrubbed in the scrubbing portion 27 of cooling tower-stack 26 with a slurry of limestone in water. The process conditions are tabulated in Table II.

The stack gas released to the atmosphere has the composition tabulated in Table III.

TABLE I.—FLUE GAS (LINE 25), TEMPERATURE 300° F.

| Component: | Flow rate (lb.-mol/hr.) |
|---|---|
| $SO_2$ | 329 |
| $H_2O$ | 7,880 |
| $CO_2$ | 21,900 |
| $N_2$ | 112,200 |
| $O_2$ | 6,970 |

TABLE II

| Line | Temp., °F. | Flow rate (lb.-mol/hr.) |
|---|---|---|
| 25 | 300 | 149,279 |
| 28 | 85 | 160,000 |
| 34 [1] | 110 | 143,800 |
| 41 | 85 | 4,820,000 |
| 42 | 110 | 4,820,000 |
| 44 | 110 | 4,963,800 |
| 45 [2] | 75 | 2,035,000 |
| 47 | 85 | 4,870,000 |
| 48 | 85 | 50,000 |
| 51 | 85 | 164,000 |
| 52 | | 326 |

[1] The filter cake withdrawn from the filter 32 contains 1,366 lb.-mol/hr. of water, 296 lb.-mol/hr. of $CaSO_3 \cdot 2H_2O$ and 30 lb.-mol/hr. of $CaCO_3$.
[2] The air introduced through inlet 45 has a relative humidity of 70%.

TABLE III
[Stack gas-temp., 100° F.]

| Component | Flow rate (lb.-mol/hr.) | Mole percent |
|---|---|---|
| $SO_2$ | 33 | 0.0014 |
| $H_2O$ | 162,750 | 7.0 |
| $CO_2$ | 22,196 | 0.9 |
| $N_2$ | 86,000 | 3.7 |
| Air | 2,068,170 | 88.4 |

A distinct advantage of the process of this invention is that it eliminates the necessity of providing separate equipment for cleaning flue gases, as heretofore practiced in the art, and thus lowers the overall installation costs. In addition, in accordance with the preferred embodiment, a portion of the cooling requirements for a plant and a scrubbing of plant off-gas may be effected in a single piece of equipment. Furthermore, the sulfur dioxide content of the off-gas is reduced to such a level, e.g., 0.0014 mol percent, that no nearby area should experience any unpleasant sulfur dioxide odors. Moreover, the water employed for scrubbing the sulfur dioxide is conserved and effectively re-used in the process.

Obviously many modifications and variations of the present invention are possible in the light of the above teachings. It is therefore to be understood, that within the scope of the appended claims, the invention may be practiced otherwise than as specifically described.

What is claimed is:

1. In a plant wherein water is employed as a coolant and wherein a plant off-gas, containing sulfur dioxide, is produced, a process comprising:
   (a) passing coolant water, at an elevated temperature, from the plant to a combined cooling tower-stack;
   (b) contacting the coolant water with air to effect cooling of the coolant water by evaporative cooling;
   (c) recycling cooled coolant water to the plant;
   (d) passing the plant off-gas to the cooling tower-stack;
   (e) contacting the off-gas with water to remove sulfur dioxide therefrom; and
   (f) mixing off-gas from step (e) and air from step (b) prior to release to the atmosphere.

2. The process as defined in claim 1 wherein the water employed in step (e) contains calcium carbonate.

3. The process as defined in claim 2 and further comprising removing solids from and neutralizing the water from step (e), and mixing the water with coolant water introduced into the cooling tower-stack.

4. The process as defined in claim 3 and further comprising mixing a portion of the cooled coolant water from step (b) with limestone and passing the mixture to step (e) to contact the off-gas.

5. The process as defined in claim 1 wherein the water is countercurrently contacted with air in a lower portion of the cooling tower-stack, the off-gas is countercurrently contacted with water in an intermediate portion of the cooling tower-stack and the air rises from the lower portion to mix with scrubbed off-gas.

6. The process of claim 5 wherein the off-gas also contains sulfur trioxide and fly ash which are removed from the off-gas by the contact with water in step (e).

7. The process of claim 6 wherein the water in step (e) contains calcium carbonate whereby sulfur dioxide is converted to calcium sulfite and sulfur trioxide is converted to calcium sulfate and further comprising recovering a slurry of fly ash, calcium sulfite and calcium sulfate in water from step (e); removing solids from the water slurry; neutralizing the solids free water; combining the neutralized water with cooling water introduced into the cooling tower-stack in step (a); mixing a portion of the cooled coolant water from step (b) with calcium carbonate; and passing the water containing calcium carbonate to step (e).

8. The process as defined in claim 1 wherein the plant contains a steam generator, the plant off-gas is a flue gas from the steam generator and the coolant water is employed to condense steam in the plant.

9. A process for removing a member selected from the group consisting of sulfur dioxide, sulfur trioxide, fly ash and mixtures thereof from a gaseous steam, comprising:
   (a) introducing the gaseous stream into a stack;
   (b) contacting the gaseous stream in the stack with water containing calcium carbonate whereby as a result of the contact any fly ash present is scrubbed from the flue gas and any sulfur dioxide and sulfur trioxide present is converted in the water phase to calcium sulfite and calcium sulfate, respectively thereby forming solids slurried in the water; and (c) withdrawing the water slurry from said stack.

10. The process as defined in claim 9 wherein the gaseous stream is a flue gas obtained from a boiler.

11. The process as defined in claim 10 and further comprising separating the solids from the water slurry; adding calcium carbonate to the water and passing the water containing calcium carbonate to step (a) of claim 9.

References Cited

UNITED STATES PATENTS

| 736,294 | 8/1903 | Ogle | 261—17 |
| 952,970 | 3/1910 | Whitmore | 261—17 X |
| 2,805,651 | 9/1957 | Weihl | 122—379 |
| 3,239,999 | 3/1966 | Price | 261—17 X |

CHARLES J. MYHRE, Primary Examiner

U.S. Cl. X.R.

261—17